United States Patent
Hosokawa (10) Patent No.: US 11,847,238 B2
(45) Date of Patent: Dec. 19, 2023

(54) IMAGE READING APPARATUS AND METHOD OF TRANSMITTING SCAN DATA INCLUDING PASSWORD-PROTECTABLE SCAN DATA

(71) Applicant: TOSHIBA TEC KABUSHIKI KAISHA, Tokyo (JP)

(72) Inventor: Koji Hosokawa, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/844,470

(22) Filed: Jun. 20, 2022

(65) Prior Publication Data

US 2023/0031510 A1    Feb. 2, 2023

(30) Foreign Application Priority Data

Aug. 2, 2021    (JP) ................................ 2021-126662

(51) Int. Cl.
*G06F 21/60* (2013.01)
*H04N 1/00* (2006.01)
*H04N 1/32* (2006.01)

(52) U.S. Cl.
CPC ....... *G06F 21/608* (2013.01); *H04N 1/00225* (2013.01); *H04N 1/32117* (2013.01); *H04N 2201/3221* (2013.01)

(58) Field of Classification Search
None
See application file for complete search history.

(56) References Cited

U.S. PATENT DOCUMENTS

2015/0092224 A1* 4/2015 Hasegawa ............ H04N 1/4446
358/1.14

FOREIGN PATENT DOCUMENTS

JP       2019-012940 A     1/2019
WO    WO-2020/101797 A1    5/2020

OTHER PUBLICATIONS

Extended European Search Report dated Dec. 13, 2022 issued in EP Application No. 22186926.6, 12 pages.

* cited by examiner

*Primary Examiner* — Andrew H Lam
(74) *Attorney, Agent, or Firm* — FOLEY & LARDNER LLP (57) ABSTRACT

An image reading apparatus includes a scanner, an operation panel, a communication interface, and a processor. The scanner is configured to read an image of a document. The operation panel is configured to designate a transmission destination of scan data, the scan data including image data of the document read by the scanner. The communication interface is configured to transmit the scan data to the transmission destination designated on the operation panel. The processor is configured to transmit the scan data to the transmission destination without a password in response to the transmission destination designated on the operation panel being a transmission destination of an operator who operates the operation panel, and transmit the scan data protected with a password to the transmission destination in response to the transmission destination designated on the operation panel including a transmission destination of any person other than the operator.

12 Claims, 5 Drawing Sheets

| SECURITY SETTING | FIRST PASSWORD | SECOND PASSWORD |
|---|---|---|
| LEVEL 1 | ABSENCE | ABSENCE |
| LEVEL 2 | TRANSMIT ONLY TO USER: NO | ABSENCE |
| | TRANSMIT TO OTHER THAN USER: YES | |
| LEVEL 3 | PRESENCE | PRESENCE |

FIG. 6

IMAGE READING APPARATUS AND METHOD OF TRANSMITTING SCAN DATA INCLUDING PASSWORD-PROTECTABLE SCAN DATA

CROSS-REFERENCE TO RELATED APPLICATION

This application is based upon and claims the benefit of priority from Japanese Patent Application No. 2021-126662, filed on Aug. 2, 2021, the entire contents of which are incorporated herein by reference.

FIELD

Embodiments described herein relate generally to an image reading apparatus.

BACKGROUND

Typically, an image reading apparatus such as a scanner mounted on a digital multifunctional peripheral has a function of transmitting scanned image data (scan data) to a transmission destination designated by a user.

DETAILED DESCRIPTION

A typical image reading apparatus can transmit the scan data as to the transmission destination designated by the user. In typical devices, if the user designates an erroneous transmission destination, the image reading apparatus may transmit the scan data that can be browsed to the erroneous transmission destination.

Also, the typical image reading apparatus can transmit scan data in a state of being protected with a password so that the erroneously transmitted scan data cannot be browsed. If protection with the password is set for the scan data, the user spends time and effort to input the password, in some typical devices, including instances when opening the scan data scanned by the user himself/herself.

Embodiments described herein may provide, for example, an image reading apparatus capable of improving user convenience while ensuring security of scan data.

In general, according to one embodiment, there is provided an image reading apparatus including a scanner, an operation panel, a communication interface, and a processor. The scanner is configured to read an image of a document. The operation panel is configured to designate a transmission destination of scan data including image data of the document read by the scanner. The communication interface is configured to transmit the scan data to the transmission destination designated on the operation panel. The processor is configured to transmit the scan data to the transmission destination without a password if the transmission destination designated on the operation panel is a transmission destination of an operator himself/herself who operates the operation panel, and transmit the scan data protected with a password to the transmission destination if the transmission destination designated on the operation panel includes a transmission destination of any person other than the operator.

Hereinafter, this embodiment will be described with reference to the drawings.

First, a configuration of a digital multi-functional peripheral (MFP) 1 as an image forming apparatus according to an embodiment will be described.

Figure 1:
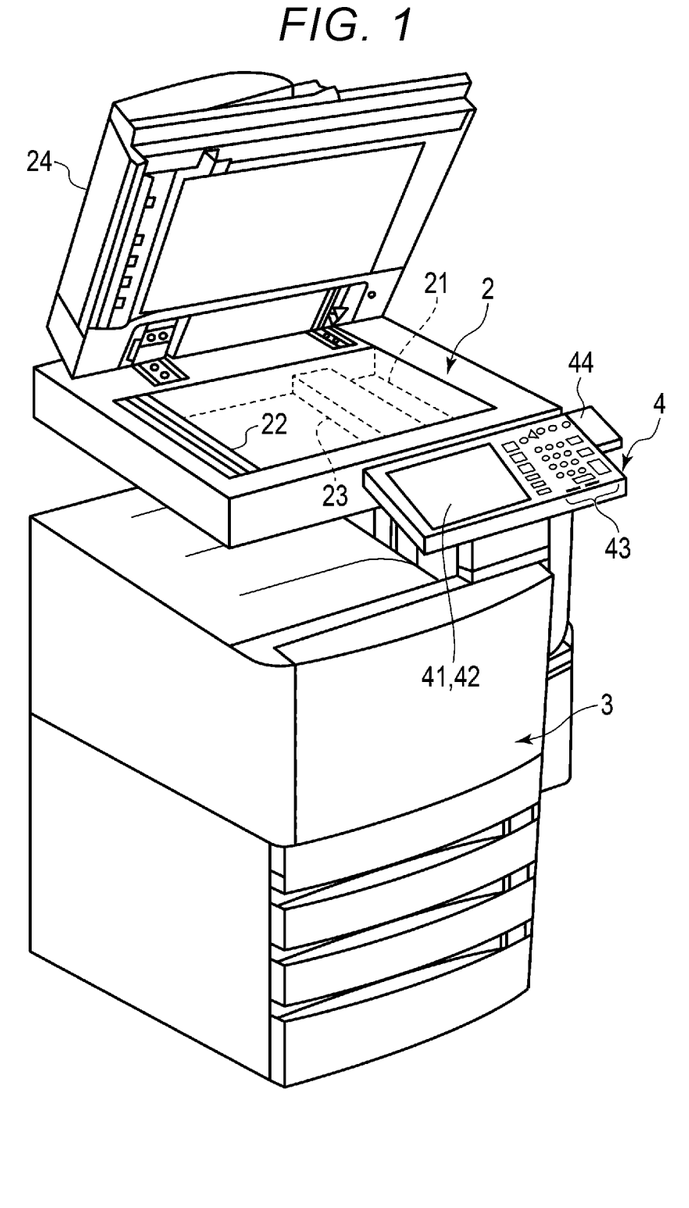
FIG. 1 is an appearance diagram of a configuration example of a digital multifunctional peripheral as an image reading apparatus according to an embodiment.

FIG. 1 is a perspective view illustrating an example of an external configuration of the digital MFP 1 as the image forming apparatus according to the embodiment.

As illustrated in FIG. 1, the digital MFP 1 includes a scanner 2, a printer 3, and an operation panel 4.

The scanner 2 is installed on an upper part of a main body of the digital MFP. The scanner 2 is a device that optically reads an image of a document. The scanner 2 includes a platen glass 21 on which the document to be scanned is placed. The scanner 2 scans the document on the platen glass 21 through a glass of the platen glass 21.

The scanner 2 includes a carriage 22, a photoelectric conversion unit or photoelectric converter 23, and the like. The carriage 22, the photoelectric conversion unit 23, and the like are installed below the platen glass 21. The carriage 22 is mounted with an optical system such as an illumination 28 (see FIG. 2), a mirror, and the like. The illumination 28 is installed on the carriage 22 so that light emitted from the illumination 28 illuminates a reading position on the platen glass 21. The reading position on the platen glass 21 to which the illumination 28 emits light is an image for one line (or a plurality of lines) in a main scanning direction. The optical system such as a mirror mounted on the carriage 22 guides light (reflected light) from the reading position, to which light is emitted by the illumination 62, to the photoelectric conversion unit 23.

The carriage 22 moves below the platen glass 21 in a sub-scanning direction by a moving mechanism or transporter 29 (see FIG. 2) including a stepping motor and the like. A position of the carriage 22 is fixed in an initial operation, and the movement of the carriage 22 in the sub-scanning direction is controlled based on the fixed position. For example, the carriage 22 continuously guides an image for each line in the main scanning direction to the photoelectric conversion unit 23 in an area (document reading area) on which the document is placed on the platen glass 21 by moving in the sub-scanning direction.

The photoelectric conversion unit 23 includes a lens, a photoelectric conversion sensor, a cover, and the like. The lens collects light guided by the optical system of the carriage 22 and guides the light to the photoelectric conversion sensor. The photoelectric conversion sensor is configured with photoelectric conversion elements. The photoelectric conversion sensor is, for example, a line sensor obtained by arranging CCDs or CISs as photoelectric conversion elements in a line shape. The line sensor as the photoelectric conversion sensor converts an image for one line in the main scanning direction (reflected light on a document surface) into pixel data for one line.

The carriage 22 is mounted with an optical system such as an exposure lamp and a mirror, and moves below the platen glass 21 in the sub-scanning direction. The carriage 22 moves the reading position on the platen glass 21 leading to the photoelectric conversion unit 23 in the sub-scanning direction. The scanner 2 reads an image of the document on the platen glass 21 by acquiring image data in the main scanning direction by the photoelectric conversion unit 23 while moving the carriage 22 in the sub-scanning direction.

The scanner 2 includes an automatic document feeder (ADF) 24. The ADF 24 also functions as a platen cover and is installed so as to be openable and closable. In a state where the ADF 24 is closed, the ADF 24 covers the entire document reading area on the platen glass 21. The ADF 24 also includes a paper feed tray, a conveyance system, and the like. The paper feed tray of the ADF 24 holds a document to be read. The conveyance system of the ADF 24 picks up the documents set in the paper feed tray one by one, and conveys the document so that a reading surface of the picked up document passes through a predetermined reading position.

The printer 3 prints an image on paper as an image-formed medium. For example, the printer 3 includes a paper feed mechanism, a conveyance mechanism, an image forming mechanism, and the like. The paper feed mechanism feeds paper. The conveyance mechanism conveys the paper fed by the paper feed mechanism. The image forming mechanism prints an image on the paper conveyed by the conveyance mechanism. The image forming mechanism may be an image forming mechanism that forms an image by any image forming method. For example, the image forming mechanism may be an image forming mechanism that forms an image by an electrophotographic method or an ink jet method. The image forming mechanism may be an image forming mechanism that prints a color image on paper, or prints a monochrome image on paper.

The operation panel 4 is a user interface. The operation panel 4 displays guidance and receives input of operation buttons or icons. For example, the user inputs setting information on the operation panel 4. The operation panel 4 includes a display unit (display) 41, a touch panel 42, and a plurality of operation buttons 43. For example, the touch panel 42 is provided on a display screen of the display unit 41. The touch panel 42 detects a portion touched by the user on the display screen of the display unit 41. The operation panel 4 includes a card reader 44 that reads a storage medium (for example, an IC card) for user authentication presented by the user.

Next, a configuration of a control system in the digital MFP configured as described above will be described.

Figure 2:
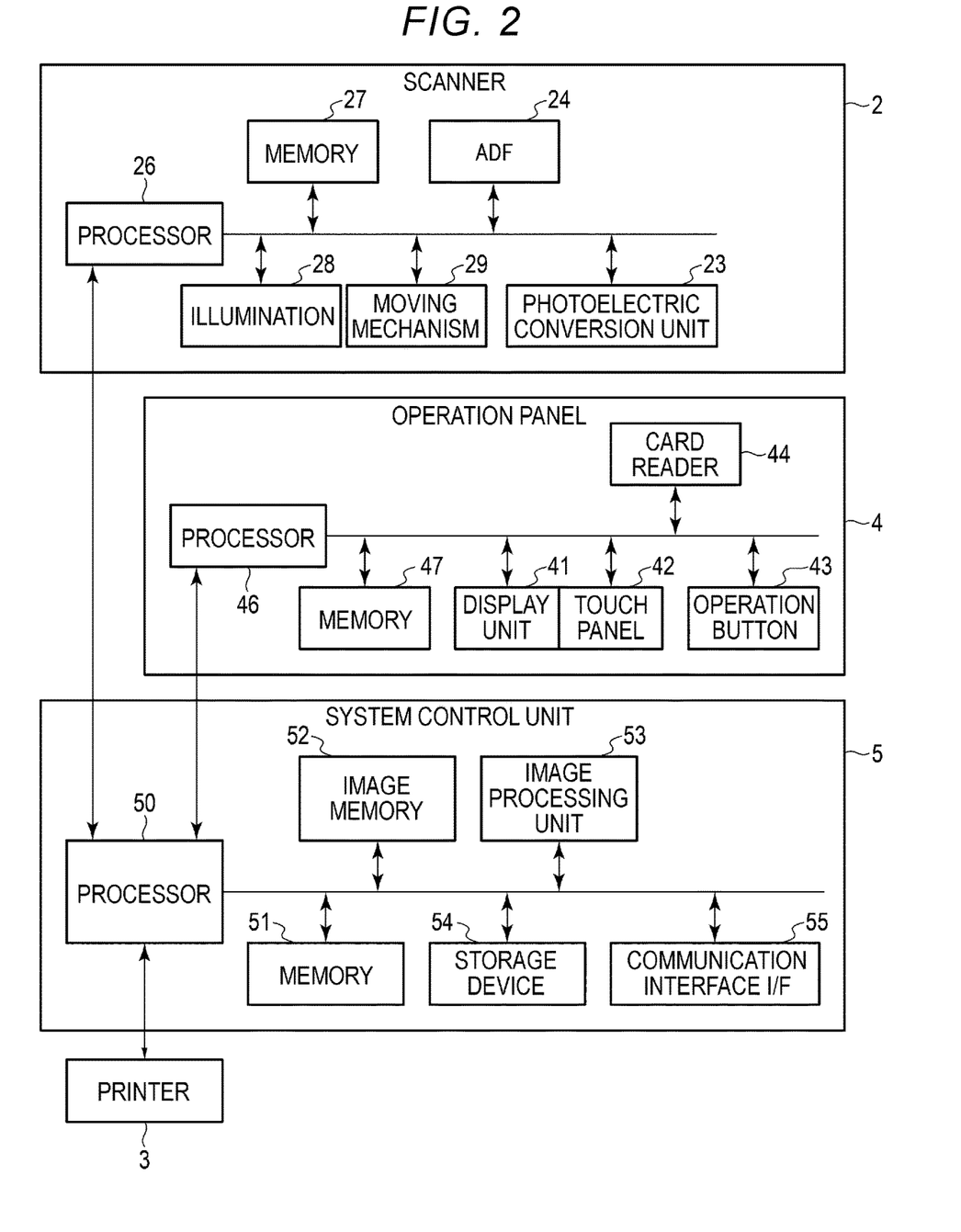
FIG. 2 is a block diagram illustrating a configuration example of a control system in the digital multifunctional peripheral.

FIG. 2 is a block diagram illustrating a configuration example of a control system in the digital MFP 1.

The digital MFP 1 includes a system control unit or system controller 5 that controls the entire apparatus. The system control unit 5 is connected to the scanner 2, the printer 3, and the operation panel 4. In the configuration example illustrated in FIG. 2, the system control unit 5 includes a processor 50, a memory or memory circuitry 51, an image memory or image memory circuitry 52, an image processing unit or image processor 53, a storage device or storage 54, a communication interface (I/F) 55, and the like.

The processor 50 is connected to the scanner 2, the printer 3, and the operation panel 4 via an interface. The processor 50 realizes various processing functions by executing a program stored in the memory 51 or the storage device 54. For example, the processor 50 outputs an action instruction to each part or processes various information from each part by executing a program stored in the memory 51.

The memory 51 includes a memory such as a random access memory (RAM), a read-only memory (ROM), and an NVM. The RAM functions as a working memory or a buffer memory. The ROM is a non-rewritable nonvolatile memory. The ROM functions as a program memory. The NVM is a rewritable, non-volatile memory. The NVM stores setting data and the like.

The image memory 52 stores image data. For example, the image memory 52 functions as a page memory for loading the image data to be processed.

The image processing unit 53 performs image processing on the image data. For example, the image processing unit 53 outputs image data obtained by performing image processing such as correction, compression, or decompression on the image data acquired by the scanner 2.

The storage device 54 stores data such as control data, a control program, and setting information. The storage device 54 is configured with a rewritable non-volatile memory. For example, the storage device 54 is configured with a storage device such as a hard disk drive (HDD) or a solid state drive (SSD).

The storage device 54 stores a user information DB (user information database) and an address information database.

The user information DB stores authentication information for authenticating a user as a registrant. For example, if user authentication is performed using a user ID and password, the user information DB stores the user ID and password for each user as a registrant. If the user is authenticated by a storage medium (IC card) for authentication, the user information DB stores identification information of the storage medium in correlation with the user ID. If user authentication is performed by biometric authentication, the user information DB stores biometric information of the user in correlation with the user ID.

An address information DB stores information indicating a transmission destination (destination) for transmitting data such as scan data. The address information DB stores, for example, information indicating an e-mail address that can be a transmission destination of the scan data or a location (folder) that can be a storage transmission destination of the scan data. The e-mail address to which the scan data is transmitted is stored in the address information DB in correlation with a name (user name, user ID, and the like) of a person to whom the scan data is transmitted. In addition, the folder that is a storage destination (transmission destination) of the scan data is stored in the address information DB in correlation with information such as a location (address) of the folder, a folder name, and a folder attribute.

The storage device 54 stores various setting information. For example, the storage device 54 may store information indicating security settings that can be set in a scan mode, and the like. The processor 50 performs security setting in the scan mode at a security level designated by an operator (user) based on information stored in the storage device 54.

A communication I/F 55 is an interface for performing data communication with an external device. For example, the communication I/F 55 is a network interface. The communication I/F 55 transmits a scanned image to a designated destination (e-mail address). The communication I/F 55 receives an image for printing and a print instruction from an external device.

Next, a configuration example of the control system in the scanner 2 will be described.

As illustrated in FIG. 2, the scanner 2 includes the photoelectric conversion unit 23, the ADF 24, a processor 26, a memory 27, the illumination 28, and the moving mechanism 29.

The processor 26 realizes various processes by executing a program stored in the memory 27. For example, the processor 26 performs action control of each part in the scanner 2 and monitoring of an action status of each part by executing a program. The processor 26 is connected to the processor 50 of the system control unit 5 via an interface. The processor 26 executes a scan process in response to an action instruction from the system control unit 5.

The memory 27 includes a memory such as the random access memory (RAM), the read-only memory (ROM), and a data memory. The RAM functions as the working memory or the buffer memory. The ROM is the non-rewritable nonvolatile memory. The ROM functions as the program memory. The data memory is the rewritable nonvolatile memory.

The ADF 24 includes a pickup roller and a conveyance system as a configuration of the control system. The processor 26 drives the pickup roller and the conveyance system to convey the documents one by one to a reading position.

The illumination 28 is mounted on the carriage 22 and irradiates the reading position on the platen glass 21 with light. The illumination 28 includes a light source that emits light according to a lighting instruction from the processor 26. The light source is not limited to a specific configuration. Light emitted by the illumination 28 becomes reflected light from the document placed on the platen glass 21 and is incident on the photoelectric conversion unit via an optical system such as the mirror and the lens.

The moving mechanism 29 is a mechanism for moving the carriage 12. The moving mechanism 29 includes a stepping motor and the like as a drive source. The moving mechanism 29 moves the carriage 22 by driving the stepping motor. The moving mechanism 29 moves the carriage 22 according to an action instruction from the processor 26 or the processor 50 of the system control unit 5. For example, when scanning a document on the platen glass 21, the processor 26 moves the carriage 22 from a reading start position in the sub-scanning direction (FWD direction).

The photoelectric conversion unit 23 is configured with a photoelectric conversion sensor including photoelectric conversion elements that convert incident light into an electric signal. The photoelectric conversion unit 23 includes, for example, the photoelectric conversion sensor configured with the line sensor that generates pixel data for a reading line in the main scanning direction. The photoelectric conversion unit 23 also includes a lens for inputting light guided by the optical system mounted on the carriage 22 to the photoelectric conversion sensor, and the like. That is, the photoelectric conversion sensor of the photoelectric conversion unit 23 sequentially outputs pixel data for the reading line in the main scanning direction as the carriage 22 moves in the sub-scanning direction.

Next, a configuration example of the control system in the operation panel 4 will be described.

As illustrated in FIG. 2, the operation panel 4 includes a processor 46, the memory 47, the display unit (display) 41, the touch panel 42, the operation button 43, the card reader 44, and the like.

The processor 46 realizes various processes by executing a program stored in the memory 47. For example, the processor 46 performs action control of each part of the operation panel 4 and monitoring of the action status of each part by executing a program. The processor 46 is connected to the processor 50 of the system control unit 5 via the interface. For example, the processor 46 notifies the system control unit 5 of information input by the user.

The memory 47 includes a memory such as the random access memory (RAM), the read-only memory (ROM), and the data memory. The RAM functions as the working memory or the buffer memory. The ROM is the non-rewritable nonvolatile memory. The ROM functions as the program memory. The data memory is the rewritable nonvolatile memory.

The display content of the display unit 41 is controlled in response to an action instruction from the processor 26. The touch panel 42 is provided on the display screen of the display unit 41, and detects a touched position on the display screen. For example, the processor 26 displays an icon selectable on the touch panel 42 on the display screen of the display unit 41 together with operation guidance. The processor 26 determines information input by the user according to the touch position detected by the touch panel 42.

The operation button 43 is configured with hard keys such as a start key, a ten-key, and a reset key.

The card reader 44 reads user authentication information from a card for user authentication presented by the user. The card reader 44 reads the user authentication information from the IC card presented by the user, and supplies the read information to the processor 50.

Next, an action in the scan mode by the digital MFP 1 as the image reading apparatus according to the embodiment will be described.

The digital MFP 1 is provided with an action mode (hereinafter referred to as the scan mode) for transmitting image data (scan data) scanned by the scanner 2 to the transmission destination designated by the user. In the scan mode, the digital MFP 1 receives designation of the transmission destination of the scan data by the user. The scan data may be transmitted to a plurality of transmission destinations or only one transmission destination. The transmission destination of the scan data may be an e-mail address or information indicating a folder in which data is saved.

If the transmission destination of the scan data is only the user (operator), the digital MFP 1 transmits the scan data to the transmission destination without protecting the scan data with a password. If the transmission destination of the scan data is not only the user (including any person other than the user), the digital MFP 1 transmits the scan data protected with the password to the transmission destination.

Next, a first action example in the scan mode by the digital MFP 1 as the image reading apparatus according to the embodiment will be described.

Figure 3:
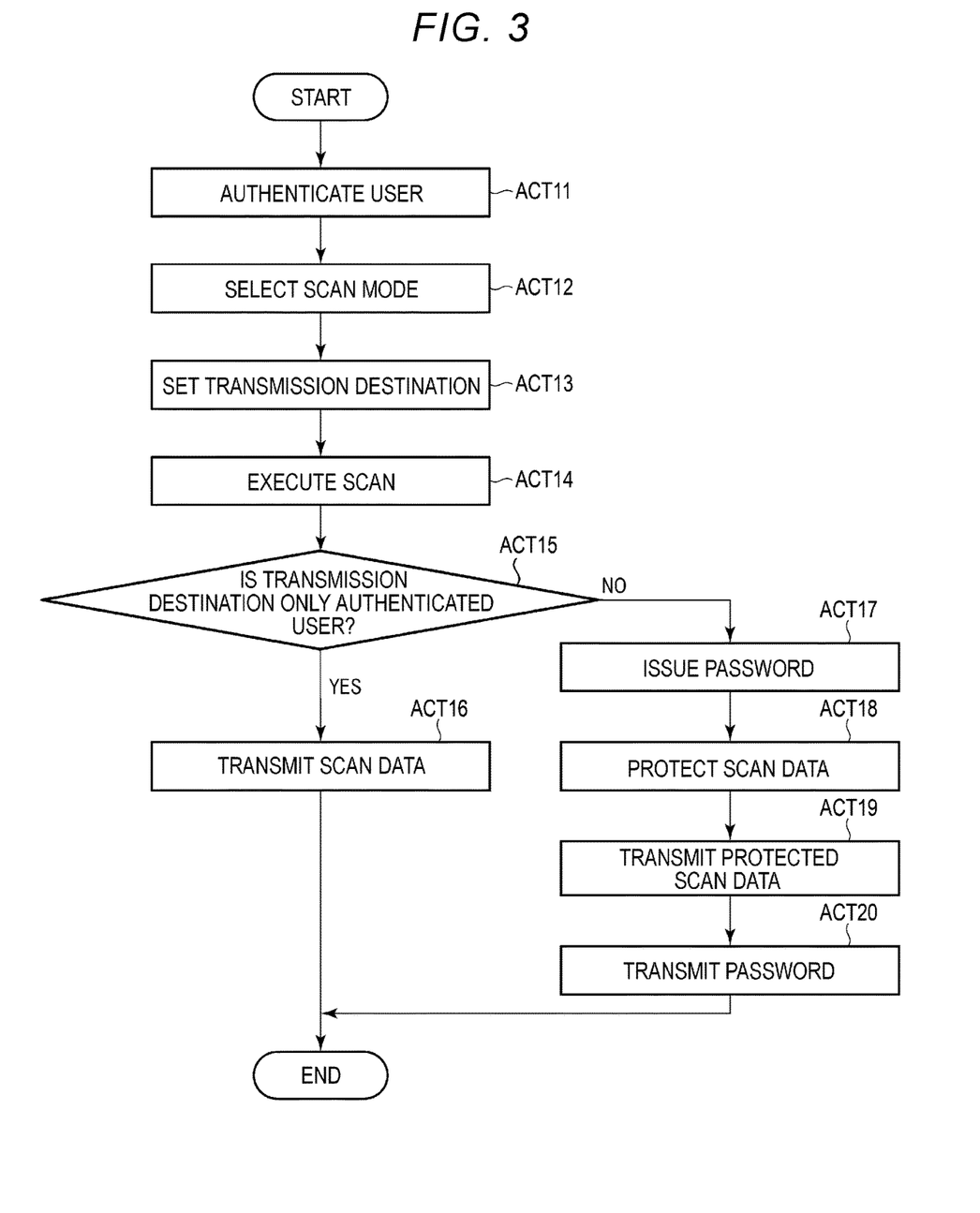
FIG. 3 is a flowchart for describing a first action example of a scan mode by the digital multifunctional peripheral.

FIG. 3 is a flowchart for describing the first action example in the scan mode by the digital MFP 1 as the image reading apparatus according to the embodiment.

The processor 50 of the system control unit 5 receives log-in by the user during standby. The processor 50 performs user authentication based on user information acquired from the user (ACT 11). For example, the processor 50 authenticates the user based on user information such as a user ID and password input by the user on the operation panel 4. The processor 50 may perform user authentication by reading information recorded on a card, which is presented by the user, by a card reader provided separately. The processor 50 may authenticate the user by biometric authentication using biometric information such as a fingerprint, a facial image, and an iris.

If the user authentication is successful, the processor 50 receives designation of an action mode by the user. For example, the processor 50 displays a menu screen that can be operated by the user on the display unit 41, and receives selection of the action mode and the like. Here, it is assumed that the user selects a scan transmission mode. The processor 50 sets the action mode to the scan mode according to the selection by the logged-in user (ACT 12).

If the action mode is set to the scan mode, the processor 50 receives setting of the transmission destination of the scan data (ACT 13). For example, the processor 50 displays a setting screen of the transmission destination of the scan data on the display unit 41. The user designates the transmission destination of the scan data on the setting screen displayed on the display unit 41 by the touch panel 42.

Figure 4:
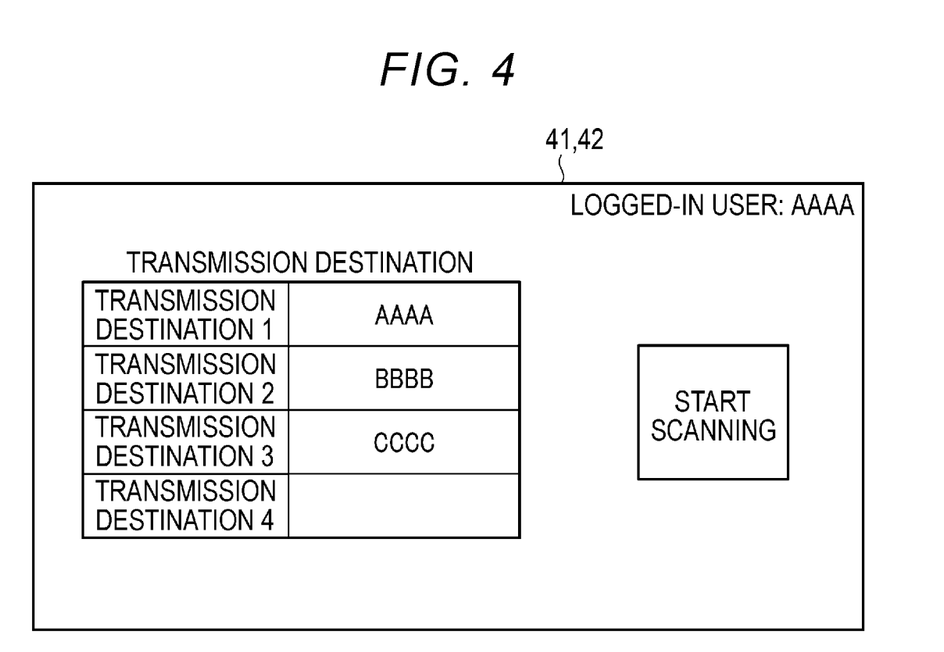
FIG. 4 is a diagram illustrating a display example of a setting screen for setting (designating) a transmission destination of scan data in the digital multifunctional peripheral.

FIG. 4 is a display example of a setting screen (transmission destination setting screen) for setting (designating) the transmission destination of the scan data to be displayed on the display unit 41 of the operation panel 4.

As illustrated in FIG. 4, in the scan mode, a plurality of scan data transmission destinations (or storage destinations) can be set. The user inputs the transmission destination to a transmission destination display field on the transmission destination setting screen using the touch panel 42 and the operation button 43. For example, if a transmission destination is input in the display field for one transmission destination, the processor 50 displays a display field for the next transmission destination. As a specific example, a processor 50 displays the display field of a transmission destination 1 on the transmission destination setting screen in an initial state. If the transmission destination is input to the display field of the transmission destination 1, the processor 50 displays the display field of a transmission destination 2.

The user inputs information indicating the transmission destination of the scan data in a state where the display field of the transmission destination is selected. The transmission destination of the scan data may be an e-mail address, or may be a folder for storing data on an accessible network. The user may set (designate) the transmission destination of the scan data by referring to the address information DB.

For example, if the display field of the transmission destination is selected, the processor 50 displays a list of user names stored in the address information DB. The user designates a person, to whom the scan data is transmitted, from the user names displayed in the list. The processor 50 inputs a transmission destination (e-mail address or folder) corresponding to the user name designated by the user in the display field of the selected state. The processor 50 may directly input the e-mail address to which the scan data is transmitted in the display field of the transmission destination.

After designating the transmission destination of the scan data, the user instructs to execute a scan. If the execution of the scan is instructed, the processor 50 starts an action of reading the image of the document by the scanner 2 (ACT 14). For example, when reading the document set in the ADF 24, the scanner 2 reads the image of the document conveyed by the ADF 14 by the photoelectric conversion unit 23. When reading the document on the platen glass 21, the scanner 2 reads the image of the document by the photoelectric conversion unit 23 while moving the carriage 22 by the moving mechanism 29. The processor 50 acquires image data read from the document by the scanner 2 as scan data.

If the execution of the scan is instructed, the processor 50 determines whether or not the designated transmission destination is only the transmission destination of the authenticated user (logged-in user, operator) (ACT 15). For example, the processor 50 determines whether or not an address designated as the transmission destination is only the address corresponding to the logged-in user. The transmission destination of the logged-in user may be stored in the address information DB, or may be read from the storage medium for authentication presented by the user.

If the user as an operator designates to save the scan data in the user's dedicated data storage location (user's own folder), the processor 50 determines that the transmission destination is only the user. When instructed to save the scan data in a data storage location (other's folders, shared folders, or the like) accessible to others other than the operator, the processor 50 determines that the transmission destination is not only the user.

If it is determined that the transmission destination is only the user (YES in ACT 15), the processor 50 transmits the scan data to the transmission destination without protecting the scan data with a password (ACT 16). That is, the processor 50 transmits the scan data acquired by the scanner 2 to the transmission destination designated by the user without locking the scan data with a password. With this configuration, the user can open the scan data sent to the designated transmission destination without inputting a password or the like.

If it is determined that the transmission destination is not only the user (NO in ACT 15), the processor 50 issues a password for protecting the scan data (ACT 17). Here, the password may be designated by the user as the operator. If the user designates the password, the processor 50 allows the user to acquire the password input using the touch panel 42 and the operation button 43.

If the password is issued, the processor 50 protects (locks) the scan data acquired by the scanner 2 with the issued password (ACT 18). For example, the processor 50 encrypts the scan data. The processor 50 allows the encrypted scan data (scan data locked with the password) to be decrypted if the password is successfully collated.

After locking the scan data with a password, the processor 50 transmits the scan data locked with the password to each designated transmission destination (ACT 19). The processor 50 transmits the password with which the scan data is locked to the transmission destination of the logged-in user who is the operator (ACT 20). The transmission destination (for example, an e-mail address) of the user as the operator may be designated from the address information DB, or may be read from the storage medium for authentication presented by the user.

The user notifies a person (recipient) of each transmission destination of the password received at his/her transmission destination. With this configuration, the scan data sent to each transmission destination can be opened only by the recipient who knows the password notified from the user who is the operator. In other words, even if the scan data is sent to an erroneous transmission destination and the like, a person who does not know the password cannot browse the scan data.

As described above, the digital MFP according to the first action example transmits scan data without the password if the transmission destination is only the user himself/herself, and transmits the scan data locked with a password if the transmission destination is any person other than the user.

With this configuration, the digital MFP can immediately open the scan data transmitted to the user himself/herself, and can lock the scan data sent to any person other than the user himself/herself with the password. As a result, the digital MFP can improve convenience of the user while ensuring security of the scan data against a third party.

Next, a second action example in the scan mode by the digital MFP 1 as the image reading apparatus according to the embodiment will be described.

As the second action example, the digital MFP 1 as the image reading apparatus allows the user to designate security settings for a process of transmitting the scan data to the transmission destination. For example, the digital MFP 1 executes security setting with a set content designated by the user from a plurality of types of set contents in a scan mode. The security settings that can be designated by the user include the security settings described in the first action example.

Figure 5:
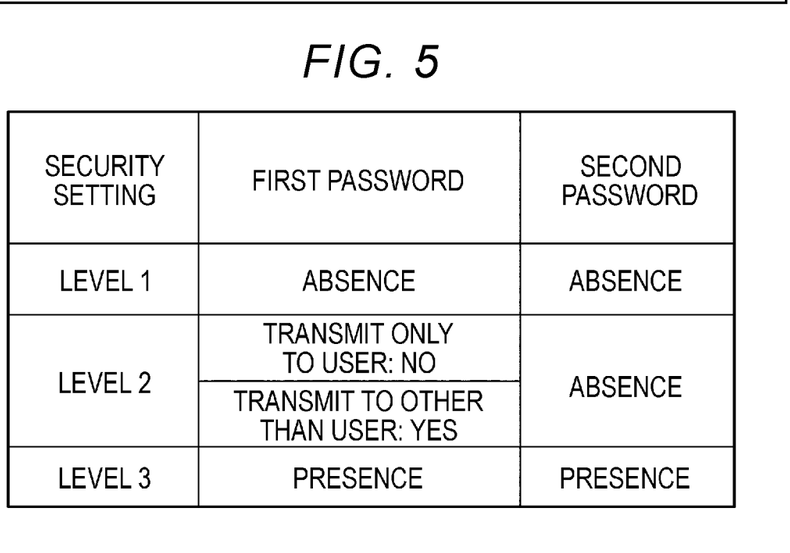
FIG. 5 is a diagram illustrating an example of security settings in the digital multifunctional peripheral.

FIG. 5 is a diagram illustrating an example of a setting content (security level) that can be designated by the user as security settings in the scan mode.

In the example illustrated in FIG. 5, it is assumed that three security levels can be designated as the security settings in the scan mode.

"Level 1" is a setting for transmitting all scan data (including scan data to be transmitted to others) without protecting all scan data with a password.

"Level 2" is the security setting described as the first action example with reference to FIG. 3. In other words, in "Level 2", a password is not set if the transmission destination is only the user himself/herself, and a password is set for the scan data if the transmission destination includes any person other than the user.

"Level 3" is a setting for transmitting all scan data (including scan data to be transmitted to the user) in a state of being protected with a double password (first password and second password). For example, the first password is transmitted to the transmission destination of the user who is the operator, and the second password is displayed on a display device such as the display unit 41.

Next, a second action example of the scan mode by the digital MFP 1 as the image reading apparatus according to the embodiment will be described.

Figure 6:
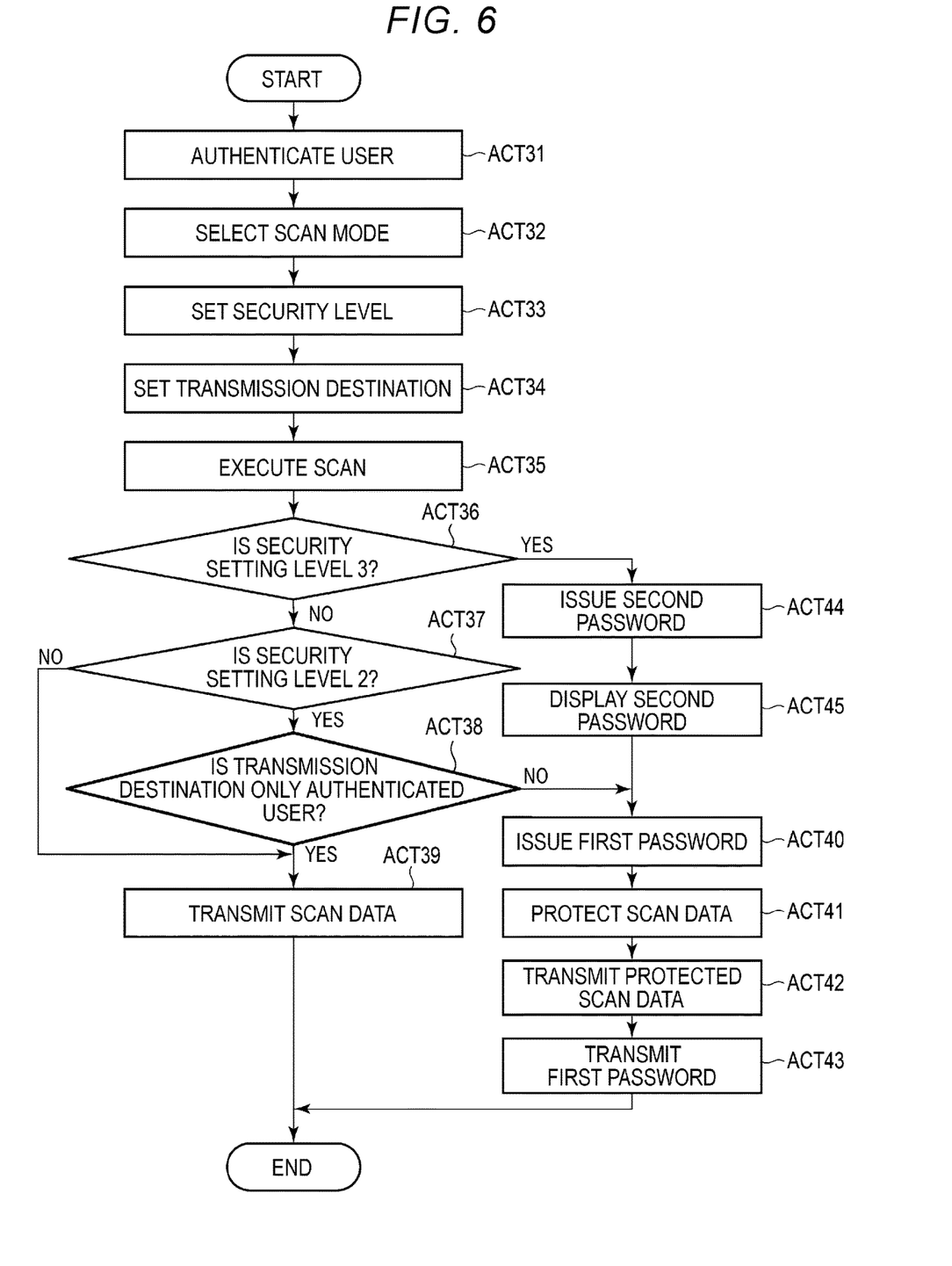
FIG. 6 is a flowchart for describing a second action example of the scan mode in the digital multifunctional peripheral.

FIG. 6 is a flowchart for describing the second action example in the scan mode by the digital MFP 1 as the image reading apparatus according to the embodiment.

Here, it is assumed that the digital MFP 1 performs the security setting in the scan mode according to a setting content designated by the user from a three-step setting content (security level) as illustrated in FIG. 5.

First, the processor 50 of the system control unit 5 receives log-in by the user during standby. The processor 50 performs user authentication based on user information acquired from the user (ACT 31). For example, the processor 50 performs user authentication based on information read from the card for authentication presented by the user by the card reader 44. The processor 50 may authenticate the user based on user information such as the user ID and the password input by the user on the operation panel 4. The processor 50 may authenticate the user by biometric authentication using biometric information such as a fingerprint, a facial image, or an iris.

If the user authentication is successful, the processor 50 receives the designation of the action mode by the user. For example, the processor 50 displays a menu screen that can be operated by the user on the display unit 41, and receives selection of action mode and the like. Here, it is assumed that the user selects a scan transmission mode. The processor 50 sets the action mode to the scan mode according to the selection by the logged-in user (ACT 32).

If the action mode is set to the scan mode, the processor 50 receives designation of the security setting for transmitting the scan data. The processor 50 sets the security level of security designated by the user (ACT 33). For example, the processor 50 displays a security setting designation screen on the display unit 41. The user designates setting contents of the security setting on the security setting designation screen displayed on the display unit 41 by the touch panel 42.

The digital MFP 1 may set a default security level, and receive designation of a non-default security level by the user. For example, the digital MFP 1 may set "Level 2" as the default setting in the example illustrated in FIG. 5 and receive the designation of "Level 1 (low level)" or "Level 3 (high level)".

In this case, if the security level is not designated by the user (or if the user designates the standard security level), the processor 50 sets the security of "Level 2 (default level)" which is a default security level. If the user designates a low security level, the processor 50 sets the security of "Level 1 (low level)". If the user designates a high security level, the processor 50 sets the security of "Level 3 (high level)".

If security is set, the processor 50 receives setting of the transmission destination of the scan data (ACT 34). For example, the processor 50 displays the setting screen of the transmission destination of the scan data on the display unit 41. The user designates the transmission destination of the scan data on the setting screen displayed on the display unit 41 by the touch panel 42. The transmission destination may be an e-mail address or a folder for storing data on an accessible network, as described in the first action example. The user may designate the transmission destination of the scan data by referring to the address information DB, or may directly input the e-mail address.

After designating the transmission destination of the scan data, the user instructs to execute the scan. If the execution of the scan is instructed, the processor 50 starts an action of reading the image of the document by the scanner 2 (ACT 35). For example, when reading the document set in the ADF 24, the scanner 2 reads the image of the document conveyed by the ADF 14 by the photoelectric conversion unit 23. When reading the document on the platen glass 21, the scanner 2 reads the image of the document by the photoelectric conversion unit 23 while moving the carriage 22 by the moving mechanism 29. The processor 50 acquires image data read from the document by the scanner 2 as the scan data.

If the execution of the scan is instructed, the processor 50 also checks the security settings. In the operation example illustrated in FIG. 6, if it is determined that the security setting is not Level 3 (NO in ACT 36), the processor 50 determines whether or not the security setting is Level 2 (ACT 37). If it is determined that the security setting is not Level 2 (NO in ACT 37), the processor 50 determines that the security setting is Level 1.

If it is determined that the security setting is Level 1 (NO in ACT 37), the processor 50 transmits the scan data to each transmission destination without protecting the scan data with a password (ACT 39). That is, the processor 50 transmits the scan data acquired by the scanner 2 to each transmission destination designated by the user without locking the scan data with a password. With this configuration, the scan data sent to the designated transmission destination can be provided as data that can be opened without inputting a password or the like.

If it is determined that the security setting is Level 2 (YES in ACT 37), the processor 50 determines whether or not the designated transmission destination is only the transmission destination of the authenticated user (logged-in user, operator) (ACT 38). For example, the processor 50 determines whether or not an address designated as the transmission destination is only the address corresponding to the logged-in user. The transmission destination of the logged-in user may be stored in the address information DB, or may be read from the storage medium for authentication presented by the user.

If the user as the operator designates to save the scan data in the user's dedicated data storage location (user's own folder), the processor 50 determines that the transmission destination is only the user. When instructed to save the scan data in the data storage location (other's folders, shared folders, or the like) accessible to others other than the operator, the processor 50 determines that the transmission destination is not only the user.

If it is determined that the transmission destination is only the user (YES in ACT 38), the processor 50 transmits the scan data to the transmission destination without protecting the scan data with a password (ACT 39). That is, the processor 50 transmits the scan data acquired by the scanner 2 to the transmission destination of the user without locking the scan data with a password. With this configuration, the user can open the scan data sent to the designated transmission destination without inputting a password or the like.

If it is determined that the transmission destination is not only the user (NO in ACT 38), the processor 50 issues a password (first password) for protecting the scan data (ACT 40). Here, the first password may be designated by the user as the operator. If the user designates the first password, the processor 50 allows the user to acquire the first password input by using the touch panel 42 and the operation button 43.

If the first password is issued, the processor 50 protects (locks) the scan data acquired by the scanner 2 with the issued password (ACT 41). For example, the processor 50 encrypts the scan data. The processor 50 allows the encrypted scan data (scan data locked with a password) to be decrypted if the password is successfully collated.

After locking the scan data with the first password, the processor 50 transmits the scan data locked with the first password to each designated transmission destination (ACT 42). Furthermore, the processor 50 transmits the password with which the scan data is locked to the transmission destination of the logged-in user who is the operator (ACT 43). The transmission destination (for example, an e-mail address) of the user as the operator may be designated from the address information DB, or may be read from storage medium for authentication presented by the user. With this configuration, the scan data sent to each transmission destination can be opened only by a recipient who knows the password notified from the user who is the operator.

If it is determined that the security setting is Level 3 (YES in ACT 36), the processor 50 issues a second password that is different from the first password transmitted to the user (ACT 44). If the second password is issued, the processor 50 displays information indicating the second password on the display unit 41 (ACT 45). The second password needs to be notified by the user as the operator to the transmission destination person, or a person of the transmission destination needs to directly visually recognize the display unit 41. Therefore, the second password may be a character string or a number string that is easy for the operator and the person of transmission destination to remember.

If the second password is displayed, the processor 50 issues the first password (ACT 40). Here, the first password may be designated by the user as the operator. If the first password and the second password are issued, the processor 50 protects (locks) the scan data acquired by the scanner 2 with the issued first password and the second password (ACT 41). For example, the processor 50 allows the encrypted scan data (scan data locked with a password) to be decrypted if the first password and the second password are successfully collated.

After locking the scan data with the first and second passwords, the processor 50 transmits the scanned data locked with the first and second passwords to each designated transmission destination (ACT 42). Furthermore, the processor 50 transmits the first password to the transmission destination of the logged-in user who is the operator (ACT 43). With this configuration, the scan data sent to each transmission destination is protected (locked) with two passwords of the first password and the second password. As a result, if the security setting is set to Level 3, the scan data is locked with a double password and transmitted to each transmission destination in a high security state.

As described above, the digital MFP according to the second action example executes the security setting for the scan data according to the security level designated by the user. The image reading apparatus holds a plurality of types of setting contents as security settings for the scan data. In the image reading apparatus, security settings can be made to transmit the scan data to the user himself/herself without a password and to transmit the scan data locked with a password to any person other than the user.

With this configuration, the digital MFP can execute the security setting for the scan data according to an instruction by the user. As a result, the digital MFP can improve convenience of the user while ensuring security of the scan data against the third party, and can realize the security setting according to designation by the user.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image reading apparatus comprising:
   a scanner configured to read an image of a document;
   an operation panel configured to
      designate a transmission destination of scan data, the scan data including image data of the document read by the scanner;
      receive input of a security setting instruction for the scan data; and
      transmit the scan data protected with a plurality of passwords to each transmission destination in response to a security setting input to the operation panel being a first level;
   a communication interface configured to transmit the scan data to the transmission destination designated on the operation panel; and
   a processor configured to
      receive the security setting instruction via the operation panel;
      transmit the scan data to the transmission destination without a password in response to the transmission destination designated on the operation panel being a transmission destination of an operator who operates the operation panel;
      transmit the scan data protected with a password to the transmission destination in response to the transmission destination designated on the operation panel including a transmission destination of any person other than the operator;

transmit the scan data to each transmission destination without protecting the scan data with a password in response to the security setting input to the operation panel being a second level; and transmit the scan data to the transmission destination of the operator without protecting the scan data with a password and transmit the scan data protected with the password to the transmission destination of the other person other than the operator in response to the security setting input to the operation panel being a third level.

2. The apparatus according to claim 1, wherein
the processor is configured to transmit the scan data protected with the password to each transmission destination in response to a plurality of transmission destinations being designated on the operation panel.

3. The apparatus according to claim 1, wherein
the processor is configured to transmit the scan data to an address of the operator without a password in response to the transmission destination designated on the operation panel being the address of the operator, and transmit the scan data protected with the password to the transmission destination designated on the operation panel in response to the transmission destination designated on the operation panel including an address of the other person other than the operator.

4. The apparatus according to claim 1, wherein
the processor is configured to transmit the password to the transmission destination of the operator who operates the operation panel when transmitting the scan data protected with the password.

5. A method for operating an image reading apparatus, the method comprising:

reading, by a scanner, an image of a document;

designating, by an operation panel, a transmission destination of scan data, the scan data including image data of the document read by the scanner;

receiving, by the operation panel, input of a security setting instruction for the scan data;

receiving, by the operation panel, the security setting instruction;

transmitting, by a communication interface, the scan data to the transmission destination designated on the operation panel;

transmitting, by a processor, the scan data to the transmission destination without a password in response to the transmission destination designated on the operation panel being a transmission destination of an operator who operates the operation panel, and transmitting, by the processor, the scan data protected with a password to the transmission destination in response to the transmission destination designated on the operation panel including a transmission destination of any person other than the operator;

transmitting, by the processor, the scan data protected with a plurality of passwords to each transmission destination in response to a security setting input to the operation panel being a first level;

transmitting, by the processor, the scan data to each transmission destination without protecting the scan data with a password in response to the security setting input to the operation panel being a second level; and transmitting, by the processor, the scan data to the transmission destination of the operator without protecting the scan data with a password and transmitting, by the processor, the scan data protected with the password to the transmission destination of the other person other than the operator in response to the security setting input to the operation panel being a third level.

6. The method of claim 5, further comprising:
transmitting, by the processor, the scan data protected with the password to each transmission destination in response to a plurality of transmission destinations being designated on the operation panel.

7. The method of claim 5, further comprising:
transmitting, by the processor, the scan data to an address of the operator without a password in response to the transmission destination designated on the operation panel being the address of the operator, and transmitting, by the processor, the scan data protected with the password to the transmission destination designated on the operation panel in response to the transmission destination designated on the operation panel including an address of the other person other than the operator.

8. The method of claim 5, further comprising:
transmitting, by the processor, the password to the transmission destination of the operator who operates the operation panel when transmitting the scan data protected with the password.

9. A non-transitory computer readable medium storing instructions which, when executed by a processor, cause the processor to carry out operations comprising:

causing transmission of scan data to a transmission destination designated on an operation panel, the scan data including image data of a document read by a scanner;

causing transmission of the scan data to the transmission destination without a password in response to the transmission destination designated on the operation panel being a transmission destination of an operator who operates the operation panel, and causing transmission of the scan data protected with a password to the transmission destination in response to the transmission destination designated on the operation panel including a transmission destination of any person other than the operator;

causing transmission of the scan data protected with a plurality of passwords to each transmission destination in response to a security setting input to the operation panel being a first level;

causing transmission of the scan data to each transmission destination without protecting the scan data with a password in response to the security setting input to the operation panel being a second level; and causing transmission of the scan data to the transmission destination of the operator without protecting the scan data with a password and transmitting, by the processor, the scan data protected with the password to the transmission destination of the other person other than the operator in response to the security setting input to the operation panel being a third level.

10. The non-transitory computer readable medium according to claim 9, wherein the operations further comprise:

causing transmission of the scan data protected with the password to each transmission destination in response to a plurality of transmission destinations being designated on the operation panel.

11. The non-transitory computer readable medium according to claim 9, wherein the operations further comprise:

causing transmission of the scan data to an address of the operator without a password in response to the transmission destination designated on the operation panel being the address of the operator, and causing transmission of the scan data protected with the password to the transmission destination designated on the operation panel in response to the transmission destination designated on the operation panel including an address of the other person other than the operator.

12. The non-transitory computer readable medium according to claim 9, wherein the operations further comprise:

causing transmission of the password to the transmission destination of the operator who operates the operation panel when the scan data protected with the password is transmitted.

* * * * *